United States Patent [19]

Dunne

[11] Patent Number: 5,418,609
[45] Date of Patent: May 23, 1995

[54] APPARATUS AND METHOD FOR MOUNTING A RANGE FINDING INSTRUMENT TO A THEODOLITE TELESCOPE

[75] Inventor: Jeremy G. Dunne, Littleton, Colo.

[73] Assignee: Laser Technology, Inc., Englewood, Colo.

[21] Appl. No.: 121,363

[22] Filed: Sep. 14, 1993

[51] Int. Cl.⁶ .................. G01C 3/08; F16L 3/00; F16M 11/00; F16M 11/08
[52] U.S. Cl. .................. 356/5.01; 248/123.1; 248/162.1; 248/178; 248/186; 248/582; 248/592
[58] Field of Search ............ 248/123.1, 582, 592, 248/162.1, 178, 186; 356/5

[56] References Cited

U.S. PATENT DOCUMENTS 4,466,590  8/1984  Parks et al. ................ 248/185
4,729,533  3/1988  Hillary et al. ............... 248/184
4,979,709  12/1990  Ishikawa ..................... 248/187

*Primary Examiner*—Stephen C. Bucinski
*Attorney, Agent, or Firm*—William J. Kubida; Holland & Hart

[57] ABSTRACT

An apparatus and method for mounting a range finding instrument to a theodolite telescope incorporates the necessary geometry to enable a linear spring assembly to be able to accurately balance the mass of the range finder and theodolite combination rotating in a vertical plane about a pivot point defining a first axis. In a particular embodiment of the mounting system, two compression springs are mounted in a single straight spring tube which is attached to the range finder but is allowed to rotate about a second axis. The resultant geometry of the arrangement provides a substantially exact balance for the weight of the range finder irrespective of the vertical angle of the theodolite telescope.

56 Claims, 4 Drawing Sheets

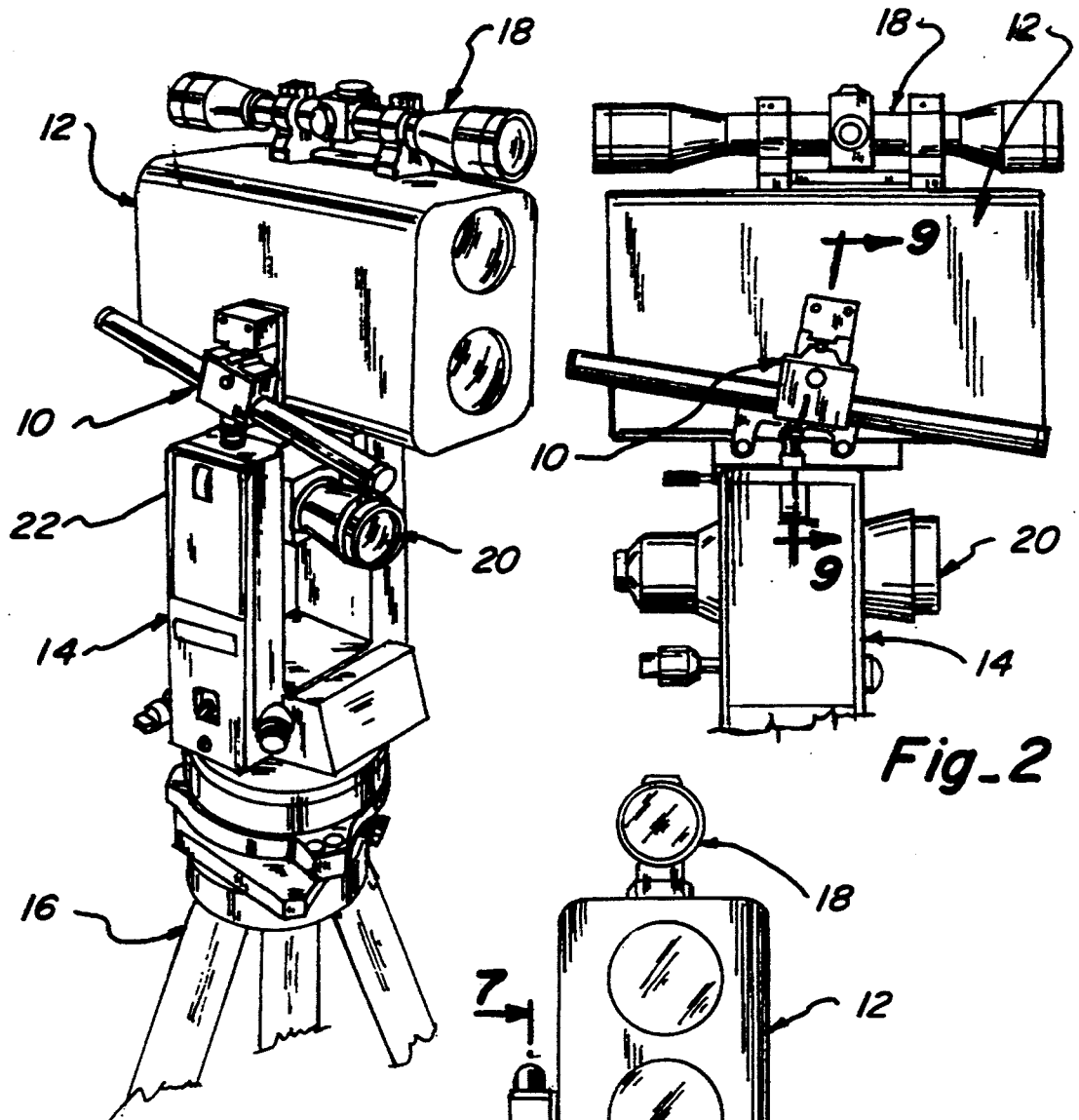
Fig_1
Fig_2
Fig_3

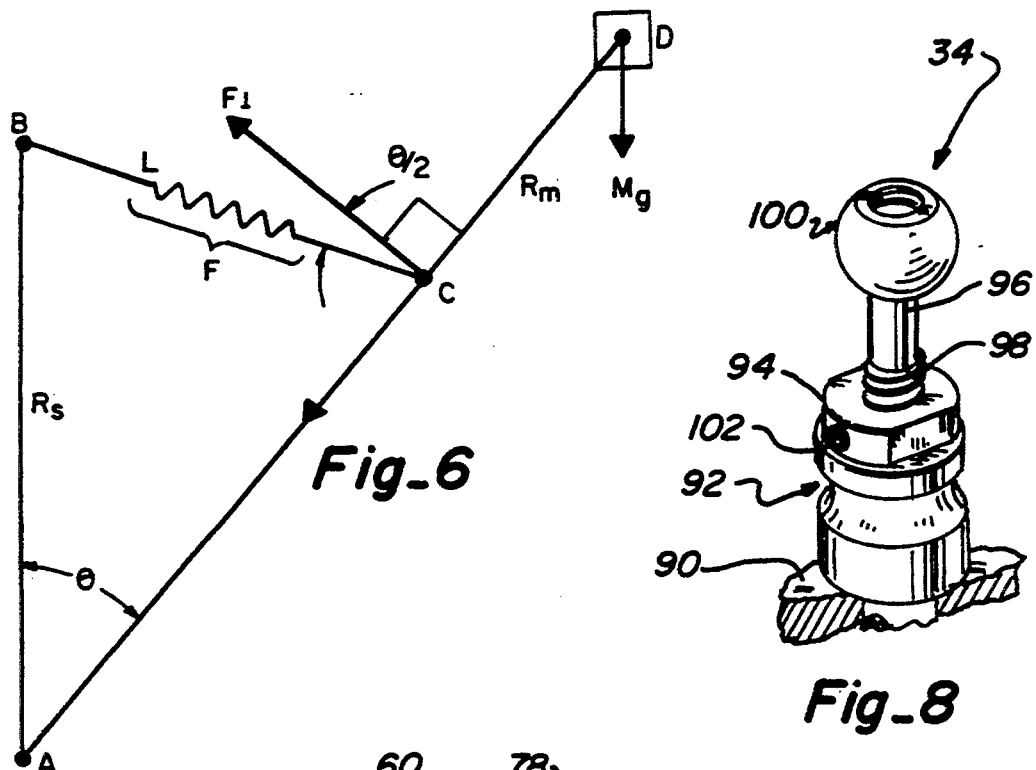
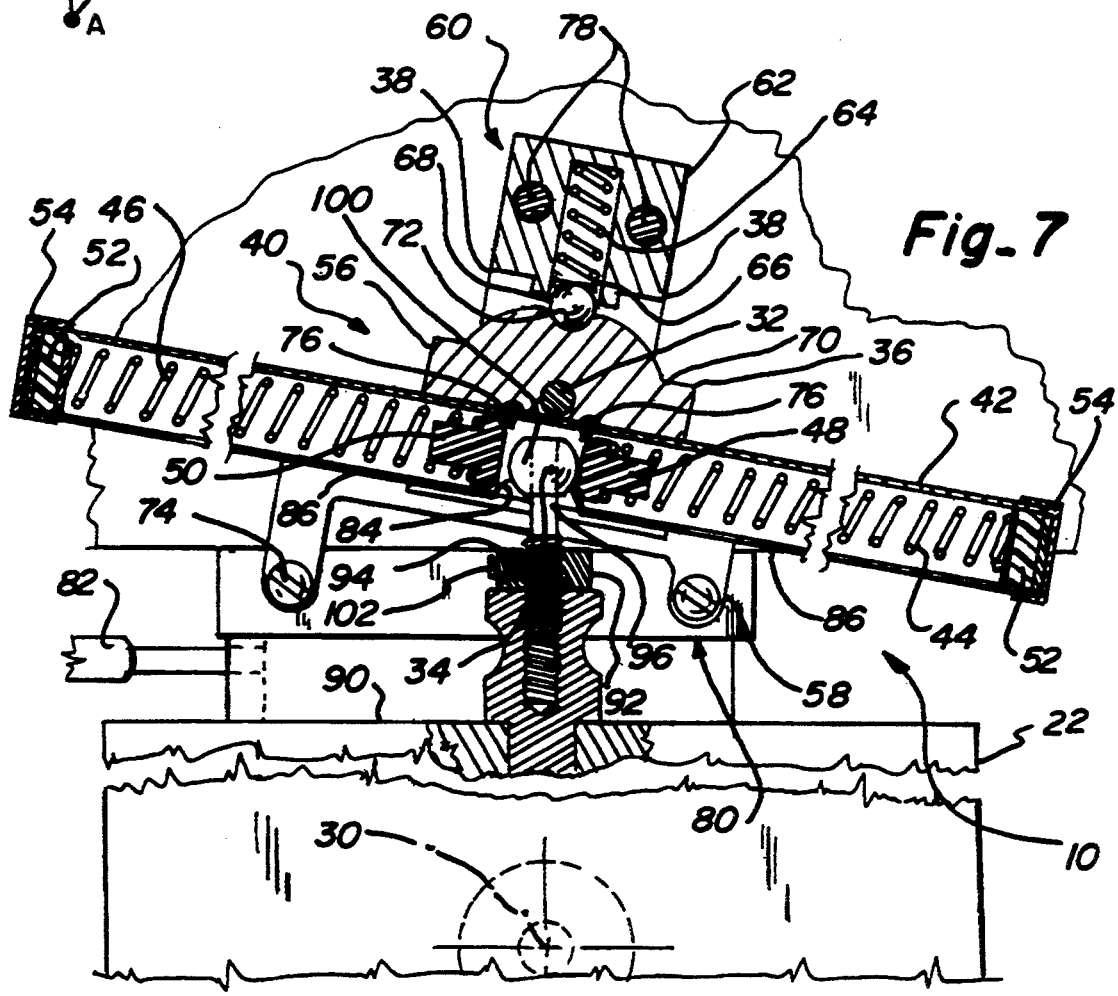

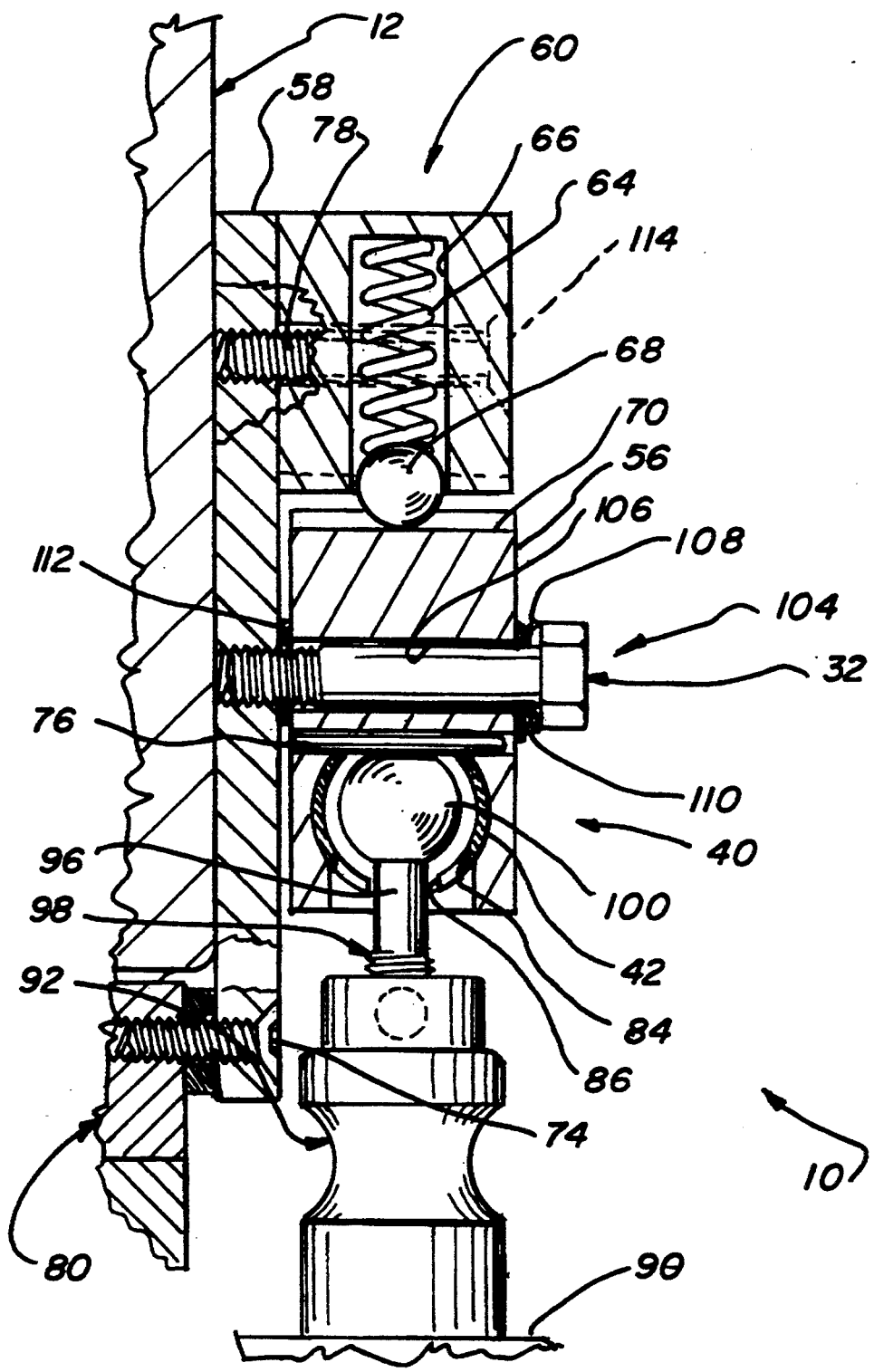
Fig_9

APPARATUS AND METHOD FOR MOUNTING A RANGE FINDING INSTRUMENT TO A THEODOLITE TELESCOPE

BACKGROUND OF THE INVENTION

The present invention relates, in general, to an apparatus and method for compensating for the mass or moment of a device pivotally secured to a mounting member. More particularly, the present invention relates to an apparatus and method for attaching a range finding instrument, such as a laser range finder, to the telescope of a theodolite through the use of an improved mounting system to accurately balance and compensate for the weight of the range finding instrument throughout its vertical range of motion about the theodolite telescope pivot point.

There is a need to be able to mount a range finding instrument, such as a laser range finder, directly to the telescope of a theodolite in order to provide the capability of accurately measuring ranges as well as angles to remote targets. Since it is often necessary that the range finder be mounted to, and hence track with, the theodolite telescope, the range finder adds an additional mass and moment arm about the theodolite telescope pivot point. One common method of compensating for the additional weight has been to attach a counterbalance weight to the underside of the theodolite telescope in order to compensate for the additional moment about the pivot point due to the added weight of the range finder. This method has, among others, the disadvantages of adding extra weight to the telescope pivot point bearings as well as providing an undesirable extra weight to be carried in conjunction with the portable theodolite instrument. Moreover, due to inherent space limitations on most theodolites, the counterbalance weight must generally be heavier than the range finding instrument itself to function properly. For this reason, the use of a counterbalance is typically unsuitable, except for the most compact and lightweight range finders which might be adapted to a theodolite telescope.

Alternatively, springs have been used to balance the weight of the range finder in combination with the theodolite telescope. In this regard, two types of spring balancing systems have been utilized. A first technique utilizes a pair of compression springs housed in a pair of angularly disposed tubes that are rigidly affixed to the range finder at fixed angles thereto. The springs are engaged by a post on the theodolite housing such that rotation of the theodolite telescope causes one or the other of the springs to be compressed as the theodolite telescope is rotated about its pivot point. The force generated by the compression of the springs in these fixed tubes only approximately balances the weight of the range finder and the added weight of the range finder, when not properly balanced, makes fine adjustments to the theodolite very difficult. Moreover, due to the geometry of the fixed tubes incorporated in such system, the vertical angle through which the telescope can be rotated is typically limited to only +/−30 degrees or less from the horizontal.

The second known spring balance technique is similar to the first except that the compression springs are instead mounted in a single curved housing rather than in separate, angularly displaced tubes. The use of a curved housing for the compression springs ameliorates, somewhat, the rotational limitation problems of the first technique but not the inherent balance approximation that it provides. In fact, using a curved spring housing, the greater the angle through which the telescope is turned, the worse the balance approximation becomes. Moreover, since the springs are forced to move in a curvilinear path, considerable friction is generated between the springs and the housing which not only also interferes with the fine adjustment of the theodolite telescope but concomitantly causes undesirable wear in the mechanism.

It is, therefore, highly desirable to provide an apparatus and method for attaching a range finding instrument to the telescope of theodolite which provides accurate balance for the added weight of the range finding instrument over a wide range of vertical angles and which overcomes the aforementioned shortcomings of prior art techniques.

SUMMARY OF THE INVENTION

The invention herein disclosed is an apparatus and method for mounting a range finding instrument to a theodolite telescope that provides geometrically accurate compensation for the added weight of a range finding instrument when mounted to a theodolite telescope and provides enhanced vertical range of motion to the combination of instruments. In a particular embodiment, the technique described utilizes two compression springs mounted in a single, substantially straight tube. The tube is pivotally affixed to the range finder and is allowed to rotate about this attachment point. The fundamental geometry of the arrangement provides a substantially exact balance for the weight of the range finder irrespective of the angle of the theodolite telescope. The rotating spring tube described herein also eliminates the inherent geometric approximation problems of the prior art angularly disposed fixed and curvilinear spring tube systems, allowing the theodolite telescope to accurately traverse vertical angles of +/−60 degrees or more. The method and apparatus of the present invention also maintains the common quick connect/disconnect feature utilized in most existing theodolite telescope mounting systems and can be configured such that the theodolite itself need not be altered.

In one embodiment of the present invention, a mounting device is disclosed for attaching a range finding instrument to a theodolite telescope upper surface wherein the telescope pivotally rotates about a first axis extending between first and second arms of a yoke mounting, the yoke mounting being supported by a theodolite stand. The mounting device comprises a first mounting device member secured to the telescope upper surface and a second mounting device member secured to the range finding instrument for retainably mating with the first mounting device member. A post extends from a first arm of the yoke mounting and a substantially linear tube is pivotally affixed to the range finding instrument at a second axis. The tube has a generally medially displaced aperture therein for receiving a distal end of the post when the range finding instrument is attached to the theodolite telescope. The aperture communicates with longitudinally extending slots extending toward first and second ends of the tube. First and second elastic members, such as linear compression springs, are displaced within the tube between the aperture and the first and second ends respectively. In operation, the post may compress (or extend) the first elastic member when the range finding instrument in combination with the telescope is pivotally rotated in a first direction about the first axis towards a first stop and the post may alternatively compress (or extend) the second elastic member when the range finding instrument in combination with the telescope is pivotally rotated in a second opposite direction about the first axis towards a second stop. The distance from the first axis to the distal end of the post is substantially equal to the distance from the first axis to the second axis at any point of angular rotation between the first and second stops.

Also provided is a method for compensating for the weight of a first object intended for attachment to a second object pivotally secured about a first axis within a yoke mounting. The method comprises the steps of providing a post extending from the yoke mounting and pivotally securing a generally linear tube to the first object about a second axis. The tube has a generally medially displaced aperture communicating with longitudinally extending slots extending towards first and second ends of the tube. First and second compressibly elastic members are displaced between the aperture and the first and second ends of the tube respectively. A distal end of the post is inserted into the aperture of the tube and the first object is attached to the second object. In operation, the first elastic member is compressed between the post and a first end of the tube when the first and second objects are rotated in a first direction about the first axis as the post moves within one of the slots and the second elastic member is alternatively compressed between the post and the second end of the tube when the first and second objects are rotated in a second opposite direction about the first axis as the post moves within the other of the slots.

Further provided is an apparatus and method for compensating for the moment of a device pivotally secured to a mounting member about a first axis thereof which comprises a generally linear tube pivotally affixed to the device about a second axis. The tube has first and second elastic members extending between first and second ends thereof toward a generally medially disposed aperture communicating with a longitudinally disposed slot. A post extending from the mounting member is disposed within the aperture and the post compresses (or extends) the first elastic member when the device is rotated in the first direction about the first axis and, alternatively, compresses (or extends) the second elastic member when the device is rotated in a second direction about the first axis. The tube pivots about the second axis such that the distance from the first axis to the post remains substantially equal to the distance from the second axis to the first axis throughout the range of the device's rotation about the first axis.

BRIEF DESCRIPTION OF THE DRAWINGS

The above mentioned and other features and objects of the present invention and the manner of attaining them will become more apparent and the invention itself will be best understood by reference to the following description of a preferred embodiment taken in conjunction with the accompanying drawings wherein:

FIG. 1 is a perspective view of a tripod mounted theodolite incorporating the improved mounting system of the present invention for attaching a range finding instrument, such as a laser, to the telescope of the theodolite such that the added moment about the telescope pivot point due to the mass of the range finding instrument is effectively and accurately compensated;

FIG. 2 is a further side plan view of the laser range finder and theodolite of FIG. 1 incorporating the improved mounting system of the present invention and illustrating an essentially horizontal line of sight through both instruments with the mass of the range finder slightly forward of the theodolite telescope pivot point and the spring assembly forming an angle of substantially 8 degrees with respect to the horizontal;

FIG. 3 is a front elevational view of the theodolite and the laser range finder combination of FIGS. 1 and 2 incorporating the improved mounting system shown therein;

FIG. 6 is a simplified geometric representation of the forces encountered in rotating the theodolite telescope and range finder combination about the former's pivot point useful in illustrating how the improved mounting system of the present invention provides a substantially exact counterbalance force to compensate for the added mass of the range finding instrument;

FIG. 7 is a partially cut away, side plan view of the improved mounting system of the present invention taken substantially along section line 7—7 of FIG. 3, illustrating the pivotally mounted spring assembly as well as the spring detent mechanism and the former's engagement of the ball and post secured to the theodolite housing;

FIG. 8 is a partial isometric view of the post and ball secured to the yoke mounting cleat of the theodolite housing for engagement with the spring tube of the spring assembly; and FIG. 9 is a partially cut away rear plan view of the improved mounting assembly of the present invention taken substantially along section line 9—9 of FIG. 2 and illustrating the connection of the mounting block and spring detent mechanism to the spring assembly plate and the interaction of the post and ball secured to the theodolite mount within the spring tube of the spring assembly.

DESCRIPTION OF A PREFERRED EMBODIMENT

Figure 4:
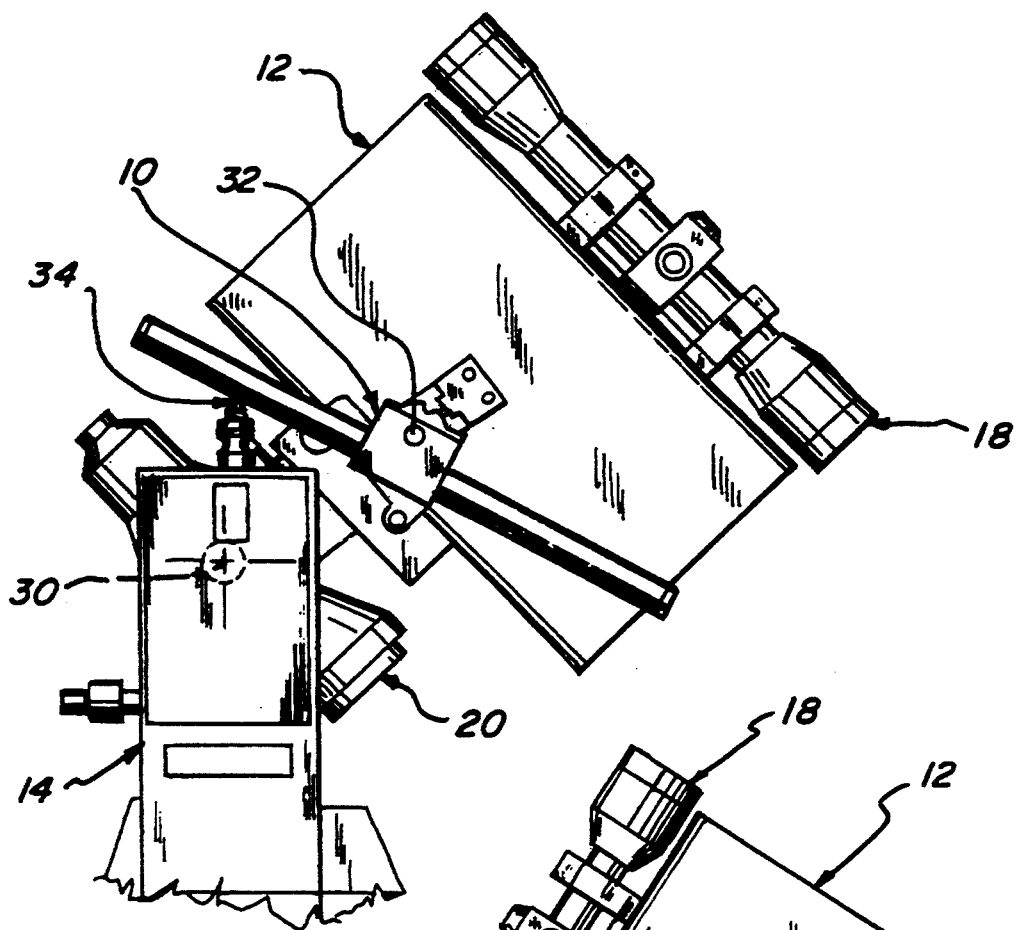
FIGS. 4 and 5 are additional side plan views of the theodolite, range finder and improved mounting system of the present invention shown in the preceding figures illustrative of the enhanced range of motion obtainable along a vertical axis, extending from below to above the horizontal respectively.

With reference now to FIGS. 1, 2 and 3, the improved mounting system 10 of the present invention is shown in conjunction with a theodolite 14 and range finder 12. The mounting system 10 of the present invention utilizes a geometric technique described hereinafter, which accurately compensates for the weight of the range finder 12 and provides a substantially exact balance for its weight irrespective of the angular displacement of the theodolite 14 telescope 20.

In a conventional manner, theodolite 14 may be mounted on a tripod assembly 16 as shown and utilize a theodolite telescope 20 which is pivotally mounted about a pivot point between a yoke-shaped upper portion of a theodolite housing 22. Range finder 12, which in the embodiment shown may be a laser range finding instrument, also incorporates a range finder sighting scope 18 mounted thereto.

In the embodiment of the mounting system 10 shown, a Criterion 100 laser range finder, manufactured by Laser Technology, Inc., assignee of the present invention, is detachably mounted to an electronic theodolite such as a DT5A manufactured by Lietz. The range finder 12 is mounted to the theodolite telescope 20 by means of a conventional quick connect/disconnect mechanism or adaptor also manufactured by Lietz, and available as part number 6702-04.

Functionally, the quick connect/disconnect mechanism replaces the peep site that is ordinarily located on the top side of the theodolite telescope 20 and the upper portion of this adaptor is attached to the lower portion of the range finder 12 by means of an interface block described in more detail hereinafter. In addition to the physical mounting of the range finder 12 to the theodolite telescope 20, the interface block also allows for electrical interconnection to the range finder 12 as well as providing attachment points for the improved mounting system 10.

In use, the upper portion of the quick connect/disconnect mechanism mates with the bottom portion, the latter of which is affixed to the theodolite telescope 20 by means of a conventional clamp mechanism and a three-point kinematic mount. Functionally, this conventional clamp mechanism comprises a generally "T" shaped bar on the upper portion that engages a slot in the bottom portion of the adaptor. When the locking lever 82 (as further described hereinafter with respect to FIG. 7) is rotated, the "T" bar is caused to slide over bevels at the bottom of the slot pulling the top and bottom portions of the adaptor tightly together. The use of a kinematic mount insures that the range finder 12 is always located properly when affixed to the theodolite telescope 20 and that its accurate alignment with the theodolite 14 is maintained.

Figure 5:
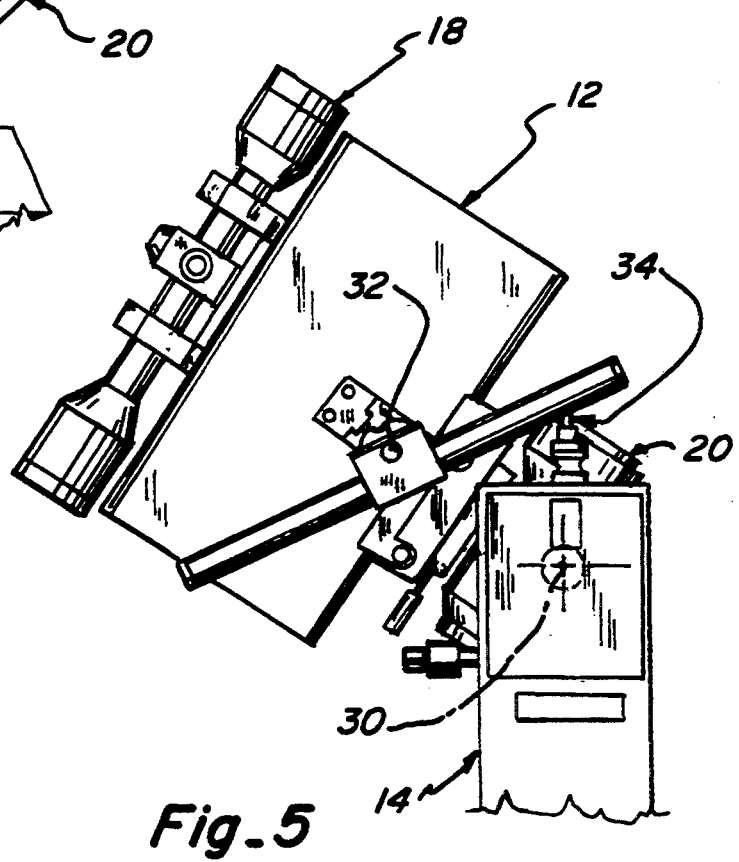

With reference additionally now to FIGS. 4 and 5, the use of the mounting system 10 to balance the combination range finder 12 and theodolite telescope 20 about a large range of rotation in a vertical plane is shown. The theodolite telescope 20 to which the range finder 12 is affixed, rotates about a first axis or pivot point 30 while the mounting system 10 is also allowed to pivot about a spring assembly pivot point, or second axis 32. As will be more fully described hereinafter, the mounting system 10 includes a fixed point 34 at a post engaged within the mounting system 10 which comprises a fixed position with respect to the theodolite housing 22.

Referring additionally now to FIG. 6, the theory of operation of the mounting system 10 which allows for an exact balance of the weight of the range finder 12 in conjunction with the theodolite telescope 20 is shown. In the representation of FIG. 6, point ("A") corresponds to pivot point 30, fixed point 34 corresponds to "B" and spring assembly pivot point 32 corresponds to "C."

As shown, the following distances are defined:
$R_x$ = Length of (A)–(B)
$R_s$ = Length of (A)–(C)
$R_m$ = Length of (A)–(D)
$L$ = Length of (B)–(C)
And, points (C) & (D) both rotate through angle $\Theta$.
Therefore, $F = L \times S$
where $S$ = Linear Spring Rate Moving mass (D) rotates about point (A) in the vertical plane and is supported by the spring force [F] acting between the fixed point (B) and the moving point (C).

For exact balance, the moment about point (A) due to the moving mass and the moment due to the spring force must be equal.

From this, it can be determined that:
1) The moment due to the mass = $M \times g \times R_m \times \text{Sin}(\Theta)$ 2) This moment due to this spring = $F\perp \times R_s$ where $F\perp$ is the component of $F$ that is normal to $(A) - (C)$ $$= FR_S \times \text{Cos}\left(\frac{\theta}{2}\right)$$

$$= L \times S \times R_S \times \text{Cos}\left(\frac{\theta}{2}\right)$$

$$= 2 \times R_S \times \text{Sin}\left(\frac{\theta}{2}\right) \times S \times R_S \times \text{Cos}\left(\frac{\theta}{2}\right)$$

$$= S \times R_S^2 \times \text{Sin}(\theta)$$

3) Therefore, for exact balance:

$$\text{Spring Rate}(S) = \frac{M \times g \times R_m}{R_s^2} \text{ (independent of } \theta\text{)}$$

So if the spring rate is equal to the above value and acts between two points such that the distance of the two points from the center of rotation is equal, as in an isosceles triangle, then the mass (M) will be exactly balanced for any angle of rotation.

Functionally, a linear spring force (whether compression or extension) is utilized to balance the rotating mass due to the range finder 12 as it is pivoted about pivot point 30 in conjunction with the theodolite telescope 20. A linear spring, as above described, is one in which the extension or compression of the spring is directly proportional to the force applied to the spring and is the most commonly available type of coil spring. In order to satisfy the requirements of the geometry of the mounting system 10, as described with respect to FIG. 6, the spring force must be zero when the mass center of the range finder 12 and theodolite telescope 20 is directly over the pivot point 30 and thereafter increase linearly with change in the spring length as the mass is rotated. In the embodiment to be described hereinafter, one means of achieving this is to mount a pair of compression springs in a straight tube. When the mass center of the range finder 12 and theodolite telescope 20 is directly over the pivot point 30, both springs are at their free or uncompressed length. However, when the range finder 12 and theodolite telescope 20 combination is rotated, one or the other of the springs compresses against a fixed point on the theodolite housing 22 and supplies the counterbalancing force. It should be noted that it is entirely within the contemplation of the present invention that other methods could be used to effectuate the technique described with respect to the mounting system 10 such as the use of opposing extension springs.

With reference additionally to FIG. 7, the mounting system 10 of the present invention is shown as comprising, in pertinent part, a spring assembly 40. Spring assembly 40 further comprises a spring tube 42 as shown. Spring tube 42 is used to contain a pair of opposing compression springs 44 and 46 within its inner diameter. Spring tube 42 may be machined from a single length of stainless steel tube with the length of the tube being slightly longer than twice the length of the springs 44 and 46. The springs 44, 46 may also be provided as linear, stainless steel springs, as the use of stainless steel for both elements gives acceptable environmental protection for the spring assembly 40. The springs 44, 46 are free to slide within the interior diameter of spring tube 42.

The medial ends of springs 44, 46 engage a pair of matching sliders 48, 50 which interact with the fixed point 34 as will be more fully described hereinafter. Sliders 48 and 50 may be preferably made of nylon or Delrin TM. The opposite distal ends of springs 44, 46 adjoin bump stops 52 at the end caps 54 of the spring tube 42. The bump stops 52 in conjunction with the end caps 54 serve to contain the springs 44, 46 within the interior diameter of spring tube 42. The end caps 54 may be attached, for example, by a screw fit within the ends of spring tube 42. The bump stops 52 may comprise a washer and portion of elastomeric material in order that when the springs 44, 46 are fully compressed, any shock that may be transmitted to the range finder 12 and theodolite telescope 20 combination would be greatly reduced.

The spring tube 42 of spring assembly 40 also includes an aperture 84 communicating with the interior of spring tube 42 at a medial, lower position thereof. A slot 86 extends longitudinally along the lower surface of spring tube 42 communicating with the aperture 84. By means of the aperture 84 and slot 86, the ball 100 and post 96 (as will be hereinafter described with respect to FIGS. 8 and 9) which form the fixed point 34 may be inserted within aperture 84 and, as the post traverses the slot 86, compress the springs 44, 46 as the range finder 12 and theodolite telescope 20 are rotated about pivot point 30 as will be more fully described hereinafter.

The spring assembly 40 of the mounting system 10 further comprises a mounting block 56 to which spring tube 42 is affixed. Mounting block 56, which may be manufactured from an aluminum alloy, is secured to the spring tube 42 by means of a pair of grooved pins 76 which form end stops for sliders 48, 50. The attachment of spring tube 42 to mounting block 56 by means of the grooved pins 76 will be more fully illustrated and described hereinafter with respect to FIG. 9. Mounting block 56 is pivotally attached about spring assembly pivot point 32 to a spring assembly plate 58 which may likewise be made of an stainless steel stock material. Spring assembly plate 58 is secured to the aforementioned interface block 80 by means of a pair of screws 74 threaded therein. Interface block 80 is secured to the lower surface of the range finder 12 and comprises the conventional quick connect/disconnect adaptor incorporating the aforedescribed clamp mechanism and 3 point kinematic mount. Locking lever 82 is utilized to secure the range finder 12 to the theodolite telescope 20 by engagement of the quick connect/disconnect adapter.

Mounting system 10 further includes a spring detent mechanism 60 which is also affixed to the spring assembly plate 58 as will be more fully described hereinafter. Spring detent mechanism 60 includes a block 62 having a spring 64 in conjunction with a ball 68 maintained within a cavity 66 within the block 62. By means of the combination of spring 64 and ball 68, spring detent mechanism 60 engages the mounting block 56 such that the ball 68 interacts with the upper surface 70 and rounded "V" groove 72 of mounting block 56. The spring detent mechanism 60 has a pair of shoulders 38 which adjoin and correspond to mounting block 56 corners 36. As spring tube 42 is rotated about spring assembly pivot point 32 through the rotation of the range finder 12 and theodolite telescope 20 combination in a vertical axis, the corners 36 approach, but do not touch the shoulders 38 of the spring detent mechanism 60. This is due to the fact that the length of the spring tube 42 and springs 44, 46 is chosen such that the full compression of the springs 44, 46 (as absorbed by bump stops 52) is reached prior to the engagement of corners 36 with shoulders 38.

The upper surface 70 of the mounting block 56 of the mounting system 10 is curved with a rounded "V" groove 72 at the center and the latter is designed to mate with the ball 68 of the spring detent mechanism 60. The spring detent mechanism 60 comprises a block 62 which is, as previously described, affixed to the spring assembly plate 58 by means of screws extending through mounting holes 78. When the spring tube 42 is rotated about the spring assembly pivot point 32, the ball 68 moves across the "V" groove 72 in the mounting block 56. The ball 68 is fully seated in the "V" groove 72 when the circular aperture 84 in the spring tube 42 is aligned with the post 96 and ball 100 comprising the fixed point 34. Since the ball 68 is forced to stay within the "V" groove 72 by means of the spring 64, the spring tube 42 tends to stay centered and requires an applied torque in order to rotate off center. This insures that the spring tube 42 remains level when the circular aperture 84 crosses the fixed post 96 and ball 100. Only when the fixed post 96 and ball 100 is constrained by the spring tube slot 86, will the spring tube 42 rotate. Without the spring detent mechanism 60, the spring tube 42 could suddenly rotate as the circular aperture 84 is crossed and jam the mounting system 10. The "V" groove 72 provides a positive centering method as previously described, however, other methods, including the use of opposing extension springs, could be utilized to provide a positive centering force.

With reference additionally now to FIG. 8, the fixed post 96 and ball 100 combination comprising the fixed point 34 is shown in more detail. The ball 100 is mounted on top of a post 96 that is screwed into a threaded hole on one of the yoke mounting cleats 92 secured to the yoke upper surface 90 of the theodolite housing 22. The post 96 engages and is retained within the yoke mounting cleat 92 by means of threads 98. A locking ring 94 in conjunction with a set screw 102 allows for fixing of the vertical alignment of post 96 and ball 100 with respect to the theodolite housing 22.

The yoke mounting cleats 92 are attached to the theodolite housing 22 and are conventionally provided to serve as attachment points for a theodolite 14 handle or mounting of other devices or mounting structures to the upper portions of the theodolite 14.

Referring additionally now to FIG. 9, the attachment of the mounting block 56 and spring detent mechanism 60 to the spring assembly plate 58 is shown in more detail. The mounting block 56 of the mounting system 10 is affixed to the spring assembly plate 58 by means of a shoulder screw 104 extending through hole 106 in the mounting block 56. The shoulder screw 104 functions as the spring assembly pivot point 32 as previously described. The mounting block 56 is spaced slightly away from the spring assembly plate 58 by means of a nylon washer 112. An additional nylon washer 110 in combination with a spring washer 108 is placed between the shoulder screw 104 and the mounting block 56. The spring detent mechanism 60, in contrast, is secured directly to the spring assembly plate 58 by means of screws 114 extending through mounting holes 78. Also as shown, the spring assembly plate 58 is directly secured to the interface block 80 by means of a pair of screws 74 and one or more spacing washers as required.

By means of the nylon washer 112 and nylon washer 110 in combination with spring washer 108, the mounting block 56 is allowed to "float" with respect to the spring assembly plate 58. The adjustability of the ball 100 and post 96 height with respect to the yoke upper surface 90 of the theodolite housing 22, as well as the "float" of the mounting block 56 in conjunction with the spring assembly 40, is provided in order that the range finder 12 may be aligned in conjunction with the theodolite telescope 20. This alignment is accomplished by a pair of screws on the lower part of the standard quick connect/disconnect adaptor affixed to the interface block 80. One set of the screws may be utilized to adjust the vertical alignment of the range finder 12 and utilizing this adjustment also alters the spacing between the range finder 12 and the theodolite telescope 20. For this reason the height of the ball 100 and post 96 is made adjustable with respect to the yoke upper surface 90 of the theodolite housing 22.

Another pair of screws of the quick connect/disconnect adaptor rotates the range finder 12 about a vertical axis such that the range finder 12 may be horizontally aligned. Inasmuch as the spring tube 42 of the spring assembly 40 is affixed to the range finder 12, this adjustment about a vertical axis may result in the spring tube 42 axis not being exactly parallel with the theodolite telescope 20 axis. Therefore, the spring tube 42 needs to be able to "float" in conjunction with the mounting block 56 on the shoulder screw 104 in order to compensate for this misalignment. The spring tube 42 mounting block 56 is, as previously described, affixed to the spring assembly plate 58 by means of the shoulder screw 104 which extends through a hole 106 which is larger than the diameter of the shoulder screw which in turn is longer than the thickness of the mounting block 56 in combination with the nylon washers 110, 112 and spring washer 108.

It should be noted that the pivot point 32 comprising the shoulder screw 104 extending through hole 106 of the mounting block 56 is in fact located slightly above the spring tube 42. Under the ideal geometric constraints of an isosceles triangle, the pivot point 32 would, instead, be aligned with the spring tube 42. The geometry that results from the relatively easier manufacturability derived from displacing the pivot point 32 slightly from the spring tube 42, provides a somewhat less than perfect balancing of the range finder 12 by means of the spring assembly 40. In practice, however, the error introduced by this small displacement in distance is relatively small and by making appropriate changes to the spring rate of the springs 44, 46, the error can be rendered insignificant.

In operation, as the combination range finder 12 and theodolite telescope 20 is rotated about pivot point 30 in the downwards direction, ball 100 engages slider 50 to compress spring 46 against one of the bump stops 52 and end caps 54 of the spring tube 42. The width of the slot 86 of the spring tube 42 is less than that of the ball 100 but wider than that of the post 96 to which the ball 100 is attached. This allows the spring tube 42 to slide freely over the ball 100 but prevents the spring tube 42 from disengaging except at the exact center of the spring tube 42 at the aperture 84. Since the aperture 84 is somewhat larger than the ball 100, the range finder in conjunction with the spring assembly 40 of the mounting system 10 may be attached or detached from the theodolite telescope 20 by means of the quick connect/disconnect adaptor as enabled by the locking lever 82.

When the range finder 12 in conjunction with the theodolite telescope 20 is rotated about the pivot point 30 in an upwards direction, the ball 100 engages the slider 48 to compress the spring 44 against the corresponding bump stop 52 and end cap 54 of the spring tube 42.

While the range finder 12 is maintained in a horizontal plane as shown in FIG. 2, its display panel and keyboard are approximately in a vertical line with the eye piece of the theodolite telescope 20. In this manner, an operator is accorded ready access to both the theodolite telescope 20 as well as the range finder 12 sighting scope 18. This arrangement results in the center of mass of the range finder 12, in the embodiment shown, being forward of the pivot point 30 when the theodolite telescope 20 is horizontal. In order to meet the requirement that the mass center be directly over the pivot point 30 when the spring force within the spring tube 42 is zero, the vertical axis of the spring assembly plate 58 is tilted forward approximately 8 degrees.

What has been provided therefore, is an apparatus and method for mounting a range finding instrument to a theodolite telescope. The mounting system of the present invention incorporates a preferred geometry necessary for a linear spring to be able to balance a mass rotating in a vertical plane. By means of the mounting system of the present invention, a range finder in conjunction with a theodolite telescope may be implemented which allows vertical angles of plus/minus 60 degrees or more to be traversed while still maintaining conventional quick connect and disconnect features common to most existing theodolite telescope mounting systems.

What is claimed is:

1. A mounting device for attaching a range finding instrument to a theodolite telescope surface wherein said telescope pivotally rotates about a first axis extending between first and second arms of a yoke mounting, said yoke mounting being supported by a theodolite stand, said mounting device comprising:

a first mounting device member secured to said telescope surface;

a second mounting device member secured to said range finding instrument for retainably mating with said first mounting device member;

a post extending from said first arm of said yoke mounting;

a substantially linear tube pivotally affixed to said range finding instrument at a second axis, said tube having a generally medially displaced aperture therein for receiving a distal end of said post when said range finding instrument is attached to said theodolite telescope, said aperture communicating with longitudinally extending slots extending toward first and second ends of said tube;

first and second compressibly elastic members displaced within said tube between said aperture and said first and second ends respectively whereby said post compresses said first elastic member when said range finding instrument in combination with said telescope is pivotally rotated in a first direction about said first axis towards a first stop and said post compresses said second elastic member when said range finding instrument in combination with said telescope is pivotally rotated in a second opposite direction about said first axis towards a second stop, the distance from said first axis to said distal end of said post being substantially equal to the distance from said first axis to said second axis at any point between said first and second stops.

2. The device of claim 1 wherein said post further comprises a ball affixed to said distal end of said post, said ball having a circumference lesser than said aperture but greater than said slot.

3. The device of claim 2 wherein said ball compresses said first and second elastic members.

4. The device of claim 1 wherein said first and second compressibly elastic members comprise coil springs.

5. The device of claim 4 wherein said coil springs are linear springs.

6. The device of claim 4 wherein said coil springs comprise stainless steel.

7. The device of claim 1 wherein said linear tube comprises stainless steel.

8. The device of claim 1 further comprising a slider interposed between said post and said elastic members.

9. The device of claim 1 further comprising a bump stop interposed between said elastic members and said first and second ends of said tube.

10. The device of claim 1 further comprising a detent mechanism for maintaining said aperture over said post when said first and second elastic members are not compressed.

11. A method for compensating for the mass of a first object intended for attachment to a second object pivotally secured about a first axis within a yoke mounting, said method comprising the steps of:
providing a post extending from said yoke mounting;
pivotally securing a generally linear tube to said first object about a second axis, said tube having a generally medially displaced aperture communicating with longitudinally extending slots extending toward first and second ends of said tube and first and second compressibly elastic members displaced between said aperture and said first and second ends respectively;
inserting a distal end of said post into said aperture of said tube;
attaching said first object to said second object;
compressing said first elastic member between said post and said first end of said tube when said first and second objects are rotated in a first direction about said first axis; and
alternatively compressing said second elastic member between said post and said second end of said tube when said first and second objects are rotated in a second opposite direction about said first axis.

12. The method of claim 11 wherein said step of providing further comprises the step of:
securing a ball to said distal end of said post.

13. The method of claim 12 wherein said steps of compressing and alternatively compressing are carried out by said ball.

14. The method of claim 11 wherein said step of pivotally securing is carried out by a shoulder screw.

15. The method of claim 11 wherein said step of attaching is carried out by means of a clamp mechanism having a 3 point kinematic mount.

16. The method of claim 11 wherein the distance from said first axis to said second axis is substantially equal to the distance from said first axis to said distal end of said post as said first and second objects are rotated in said first and second directions about said first axis.

17. An apparatus for compensating for the mass of a first object intended for attachment to a second object pivotally secured to a mounting member about a first axis thereof comprising:
a generally linear tube pivotally affixed to said first object about a second axis, said tube having first and second compressibly elastic members extending from first and second ends thereof toward a generally medially disposed aperture;
a post extending from said mounting member within said aperture, said post compressing said first elastic member when said first and second objects are rotated in a first direction about said first axis and said post compressing said second elastic member when said first and second objects are rotated in a second direction about said first axis, said tube pivoting about said second axis such that the distance from said first axis to said post is substantially equal to said distance from said second axis to said first axis.

18. The apparatus of claim 17 wherein said first and second compressibly elastic members comprise coil springs.

19. The apparatus of claim 18 wherein said coil springs are linear springs.

20. The apparatus of claim 18 wherein said coil springs comprise stainless steel.

21. The apparatus of claim 17 wherein said linear tube comprises stainless steel.

22. The apparatus of claim 17 wherein said post further comprises a ball affixed to a distal end of said post.

23. The apparatus of claim 17 wherein said first object is a range finding instrument.

24. The apparatus of claim 23 wherein said range finding instrument comprises a laser range finder.

25. The apparatus of claim 17 wherein said second object comprises a theodolite telescope.

26. The apparatus of claim 17 further comprising a slider interposed between said post and said first and second elastic members.

27. The apparatus of claim 17 further comprising a bump stop interposed between said elastic members and said first and second ends of said tube.

28. The apparatus of claim 17 further comprising a detent mechanism for maintaining said aperture over said post when said first and second elastic members are not compressed.

29. An apparatus for compensating for the moment of a device pivotally secured to a mounting member about a first axis thereof comprising:
a generally linear tube pivotally affixed to said device about a second axis, said tube having first and second compressibly elastic members extending from first and second ends thereof toward a generally medially disposed aperture;
a post extending from said mounting member within said aperture, said post compressing said first elastic member when said device is rotated in a first direction about said first axis and said post compressing said second elastic member when said device is rotated in a second direction about said first axis, said tube pivoting about said second axis such that the distance from said first axis to said post is substantially equal to said distance from said second axis to said first axis.

30. The apparatus of claim 29 wherein said device comprises a range finding instrument in combination with a theodolite telescope.

31. The apparatus of claim 29 wherein said range finding instrument comprises a laser range finder.

32. The apparatus of claim 29 wherein said first and second compressibly elastic members comprise coil springs.

33. The apparatus of claim 32 wherein said coil springs are linear springs.

34. The apparatus of claim 32 wherein said coil springs comprise stainless steel.

35. The apparatus of claim 29 wherein said linear tube comprises stainless steel.

36. The apparatus of claim 29 wherein said post further comprises a ball affixed to a distal end of said post.

37. The apparatus of claim 29 wherein said first object is a range finding instrument.

38. The apparatus of claim 37 wherein said range finding instrument comprises a laser range finder.

39. The apparatus of claim 29 wherein said second object comprises a theodolite telescope.

40. The apparatus of claim 29 further comprising a slider interposed between said post and said first and second elastic members.

41. The apparatus of claim 29 further comprising a bump stop interposed between said elastic members and said first and second ends of said tube.

42. The apparatus of claim 29 further comprising a detent mechanism for maintaining said aperture over said post when said first and second elastic members are not compressed.

43. A method for compensating for the moment of a device pivotally secured to a mounting member about a first axis thereof comprising the steps of:
pivotally securing a generally linear tube to said device about a second axis;
providing first and second compressibly elastic members communicating between first and second ends of said tube and a generally medially disposed aperture within a longitudinally disposed slot;
extending a post secured to said mounting member with said aperture for slidable retention within said slot;
compressing said first elastic member as said device is rotated in a first direction about said first axis; and
alternatively compressing said second elastic member as said device is rotated in a second opposite direction about said first axis
whereby the distance from said first axis to said post is substantially equal to the distance from said first axis to said second axis as said device is rotated in said first and second directions about said first axis.

44. The method of claim 43 wherein said step of extending further comprises the step of:
securing a ball to said distal end of said post.

45. The method of claim 44 wherein said steps of compressing and alternatively compressing are carried out by said ball.

46. The method of claim 43 wherein said step of pivotally securing is carried out by a shoulder screw.

47. An apparatus for compensating for the moment of a device pivotally secured to a mounting member about a first axis thereof comprising:
a generally linear tube pivotally affixed to said device about a second axis, said tube having first and second elastic members extending from first and second ends thereof toward a generally medially disposed aperture, said tube also having a slot extending from said aperture towards said first and second ends;
a post extending from said mounting member within said aperture and capable of being moved longitudinally of said aperture within said slot, said post deforming said first elastic member when said device is rotated in a first direction about said first axis and said post deforming said second elastic member when said device is rotated in a second direction about said first axis, said tube pivoting about said second axis such that the distance from said first axis to said post remains substantially equal to said distance from said second axis to said first axis during rotation in said first and second directions.

48. The device of claim 47 wherein said post further comprises a ball affixed to a distal end of said post, said ball having a circumference lesser than said aperture but greater than said slot.

49. The device of claim 48 wherein said ball compresses said first and second elastic members.

50. The device of claim 47 wherein said first and second elastic members comprise compression coil springs.

51. The device of claim 50 wherein said compression coil springs are linear springs.

52. The device of claim 51 wherein said compression coil springs comprise stainless steel.

53. The device of claim 47 wherein said linear tube comprises stainless steel.

54. The device of claim 47 further comprising a slider interposed between said post and said elastic members.

55. The device of claim 47 further comprising a bump stop interposed between said elastic members and said first and second ends of said tube.

56. The device of claim 47 further comprising a detent mechanism for maintaining said aperture over said post when said first and second elastic members are not compressed.

* * * * *